United States Patent [19]

Capaccio et al.

[11] Patent Number: 4,647,640

[45] Date of Patent: Mar. 3, 1987

[54] POLYMER MATERIALS

[75] Inventors: Gianlarlo Capaccio, Leeds; Ian M. Ward, Gramhope, both of England

[73] Assignee: National Research Development Corporation, England

[21] Appl. No.: 715,359

[22] Filed: Mar. 25, 1985

Related U.S. Application Data

[60] Division of Ser. No. 217,511, Dec. 17, 1980, Pat. No. 4,525,564, which is a division of Ser. No. 943,856, Sep. 19, 1978, Pat. No. 4,268,470, which is a continuation of Ser. No. 739,074, Nov. 5, 1976, abandoned.

[30] Foreign Application Priority Data

Nov. 15, 1975 [GB] United Kingdom ............ 45920/75

[51] Int. Cl.$^4$ ............................................. C08F 10/02
[52] U.S. Cl. ................................................. 526/348.1
[58] Field of Search .............. 264/176 F, 210.8, 290.2, 264/290.5, 288.4; 526/348.1; 525/323

[56] References Cited

U.S. PATENT DOCUMENTS

| | | | |
|---|---|---|---|
| 3,246,061 | 4/1966 | Blatz | 526/348.1 |
| 3,271,495 | 9/1966 | Gronholz | 264/290.2 |
| 3,361,859 | 1/1968 | Cenzato . | |
| 3,413,397 | 11/1968 | Bierbaum et al. . | |
| 3,447,202 | 6/1969 | Kato . | |
| 3,509,116 | 4/1970 | Cote | 264/290.2 |
| 3,536,219 | 10/1970 | Williams . | |
| 3,536,644 | 10/1970 | Frizelle | 264/290.2 |
| 3,574,044 | 4/1971 | Shepherd | 526/348.1 |
| 3,651,196 | 3/1972 | Starkweather, Jr. . | |
| 3,946,094 | 3/1976 | Kanetsuna et al. . | |
| 3,962,205 | 6/1976 | Ward et al. . | |
| 4,198,256 | 4/1980 | Andrews | 264/290.2 |

FOREIGN PATENT DOCUMENTS

| | | |
|---|---|---|
| 275863 | 2/1964 | Australia . |
| 656080 | 1/1963 | Canada . |
| 667632 | 7/1963 | Canada . |
| 792165 | 8/1968 | Canada . |
| 2410747 | 9/1974 | Fed. Rep. of Germany . |
| 2247322 | 4/1975 | Fed. Rep. of Germany . |
| 2509557 | 9/1975 | Fed. Rep. of Germany . |
| 2430772 | 12/1975 | Fed. Rep. of Germany . |
| 379765 | 7/1962 | Japan . |
| 3,912,859 | 7/1964 | Japan . |
| 401813 | 2/1965 | Japan . |
| 69546 | 6/1974 | Luxembourg . |
| 1469526 | 10/1973 | United Kingdom . |
| 1498628 | 1/1978 | United Kingdom . |
| 1506565 | 12/1980 | United Kingdom . |
| 1480479 | 4/1982 | United Kingdom . |

OTHER PUBLICATIONS

Barnov et al., "Super Strong Fibers of Polyethylene," Fizika Tverdogo Tela, (Lenigrad), vol. 17, No. 5., pp. 1550–1552 (1975).

Balta-Calleja et al., "Notes, The Limiting Axial Long Period of Drawn Polypropylene," Journal of Polymer Science: Part A-2, vol. 7, pp. 1275–1278 (1969).

Meinel et al., "Plastic Deformation of Polyethylene II. Change of Mechanical Properties During Drawing," Journal of Polymer Science: Part A-2, vol. 9, pp. 67–83 (1971).

Sheehan et al., "Relationships Between Structural Parameters and Tenacity of Polypropylene Monofilaments," Textile Research Journal, Jul. 1965, pp. 626–636.

Meinel et al., "Plastic Deformation of Polyethylene. I. Change of Morphology During Drawing of Polyethylene of High Density," Journal of Polymer Science: Part A-2, vol. 8, pp. 1723–1740 (1970).

Peterlin et al., "Small-Angle X-Ray Diffraction Studies of Plastically Deformed Polyethylene. II. Influence of Draw Temperature, Draw Ratio, Annealing Temperature, and Time," Journal of Polymer Science: Part A-2, vol. 6, pp. 1273–1282 (1968).

Corneliussen et al., "The Influence of Temperature on Plastic Deformation of Polyethylene," Die Mackromolekulare Chemie, vol. 105, pp. 193–203 (1967).

Andrews et al., "The Cold-Drawing of High Density Polyethylene," Journal of Material Science, vol. 5, pp. 411–417 (1970).

Capaccio et al., "Preparation of Ultra-High Modulus Linear Polyethylenes: Effective Molecular Weight and Molecular Weight Distribution on Drawing Behavior and Mechanical Properties," Polymer, vol. 15, pp. 223–238 (Apr. 1974).

Clark, "Super Drawn Crystalline Polymers: A New Class of High Strength Fiber," Polymer Preprints, vol. 15, No. 1, Apr. 19, 1974, pp. 153–160.

Sheehan et al., "Production of Super-Tenacity Polypropylene Filaments," Journal of Applied Polymer Science, vol. 8, pp. 2359–2388 (1964).

Capaccio and Ward, "Properties of Ultra-High Modulus Linear Polyethylenes," Nature Physical Science, vol. 243, No. 130, p. 143 (Jun. 25, 1973).

*Primary Examiner*—Paul R. Michl
*Attorney, Agent, or Firm*—Finnegan, Henderson, Farabow, Garrett & Dunner

[57] ABSTRACT

Oriented polymer material of high Young's modulus and low creep strain is provided by a process which comprises drawing polymer material having a weight average molecular weight greater than 150,000 and a ratio of weight average molecular weight to number average molecular weight greater than 5 at temperatures from 95° C. to 140° C. and at a rate such that the deformation ration is greater than 18.

18 Claims, No Drawings

POLYMER MATERIALS

This is a division of application Ser. No. 217,511, filed Dec. 17, 1980, now U.S. Pat. No. 4,525,564, which is a division of application Ser. No. 943,856, filed Sept. 19, 1978, now U.S. Pat. No. 4,268,470, which is a continuation of application Ser. No. 739,074, filed Nov. 5, 1976, now abandoned.

This invention relates to polymer materials and to processes for their production.

Complete Specification No. 10746/73 describes and claims an oriented high density polyethylene polymer material having a weight average molecular weight of less than 200,000, a number average molecular weight of less than 20,000, a ratio of weight average molecular weight $\overline{M}_w$ to number average molecular weight $\overline{M}_n$ such that for $\overline{M}_n > 10^4$, $\overline{M}_w/\overline{M}_n < 8$ and for $\overline{M}_n < 10^4$, $\overline{M}_w/\overline{M}_n < 20$, and a Young's modulus as therein defined greater than $3 \times 10^{10}$ N/m². Complete Specification No. 46141/73 and 9796/74 describes and claims a process for the production of a high modulus polymer material which comprises subjecting a crystallisable polymer having a weight average molecular weight of less than 300,000 and preferably less than 200,000 to a thermal treatment such that the possibility that a given molecular chain is incorporated in more than one crystal lamella is substantially reduced, and attenuating the polymer at a temperature and a rate such that the deformation ratio is at least 15. Polymers produced according to Complete Specification No. 10746/73 and Complete Specification No. 46141/73 and 9796/74 have Young's moduli far in excess of conventional materials, but at least insofar as high density polyethylene is concerned, an improvement in creep properties would be desirable, for example for use in fibre-reinforced polymer resins and cement applications.

Surprisingly, it has now been found that the previous limitation on weight average molecular weight can be substantially exceeded if the appropriate processing conditions are employed, while still obtaining polymer materials of high modulus, and that these materials have greatly improved creep properties as is the case when these processing conditions are employed on polymer materials of lower weight average molecular weight.

According, therefore, to one aspect of the present invention there is provided an oriented polymer material having a weight average molecular weight greater than 300,000; a ratio of weight average molecular weight to number average molecular weight greater than 5, preferably greater than 9; and a Young's modulus (as hereinafter defined) greater than $3 \times 10^{10}$ N/m².

According to a further aspect of the present invention, there is provided an oriented polymer material having a weight average molecular weight from 150,000 to 300,000; a ratio of weight average molecular weight to number average molecular weight greater than 5, preferably greater than 9; a Young's modulus (as hereinafter defined) greater than $3 \times 10^{10}$ N/m². and a creep strain at room temperature of less than 3% after 15 hours under a stress which produces an initial strain of 1% after 10 seconds.

This invention also provides a process for the preparation of an oriented polymer material, which process comprises subjecting a crystallisable (as hereinafter defined) or amorphous polymer having a weight average molecular weight greater than 150,000 and a ratio of weight average molecular weight to number average molecular weight greater than 5, preferably greater than 9, to attenuation at a temperature from 75° C. to 140° C. and at a rate such that the deformation ratio is greater than 18.

In this specification the Young's modulus of a polymer material, depending upon the method of measurement, is defined as being the modulus measured at 21° C. by a dead-loading creep experiment, as described by Gupta and Ward in J. Macromol. Sci. Phys. B1 373 (1967), taking the stress required to produce a strain response of 0.1% at 10 secs. The deformation ratio or draw ratio is defined either as the ratio of the final length to the initial length of the deformed polymer material or as the ratio of the cross-sectional areas before and after drawing. High density polyethylene is defined in this specification as a substantially linear homopolymer of ethylene or a copolymer of ethylene containing at least 95% by weight of ethylene, having a density from 0.91 to 1.0 gm/cm³ as measured by the method of British Standard Specification No. 2782 (1970) method 590B on a sample prepared according to British Standard Specification No. 3412 (1966) Appendix A and annealed according to British Standard Specification No. 3412 (1966) Appendix B(1). A crystallisable polymer is defined herein as one that is capable of forming a crystallisable or semi-crystallisable structure on cooling from the melt.

The invention may be applied to a range of crystallisable or amorphous polymers but is particularly applicable to vinyl polymers for example linear and branched chain vinyl hydrocarbon polymers such as polyethylene, polypropylene, ethylene/propylene block copolymers and ethylene/hexene-1-copolymers. The invention may also be applied to other linear or branched chain organic polymers such as polyethylene oxide, polyacetaldehyde, and fluorinated polymers such as polytetrafluoroethylene and polychlortrifluorethylene. Particularly good results have been obtained with high density polyethylene, such as that produced by polymerising ethylene in the presence of a transition metal catalyst.

Preferably the weight average molecular weight ($\overline{M}_w$) of the polymer is greater than 200,000 but less than 2,000,000, more preferably from 310,000 to 1,000,000. The number average molecular weight ($\overline{M}_n$) is preferably from 15,000 to 100,000 more preferably from 15,000 to 50,000. The average molecular weights quoted in this specification are measured by gel permeation chromatography, light scattering, or by estimation from melt viscosity data.

In the process of the present invention the polymer is attenuated at a temperature and a rate such that the deformation ratio is greater than 18 and preferably at least 20. A preferred attenuation process comprises drawing the polymer to a draw ratio of at least 20. The optimum draw temperature depends upon the molecular weight of the polymer and increases with increasing molecular weight. The polymer is preferably drawn at a temperature from 85° C. to 130° C., and most preferably from 100° C. to 120° C. As a general rule the polymers are preferably drawn at speeds in excess of 1 cm per minute, usually around 5 to 50 cm per minute, or on a draw frame at speeds from 10 to 100 meters per minute. The orientation will in most cases be uniaxial, although it is also possible with an appropriate drawing process to produce biaxially oriented polymer materials.

The invention is particularly suitable for the production of fibres, films and tapes. In particular continuous filaments and tapes may be produced by melt spinning and drawing on a draw frame. For convenience the diameter of the fibre, or the thickness of the film or tape, before drawing is preferably less than 1 mm.

In continuous processes, it has been found desirable, immediately after extrusion, to pass the polymer material into a bath maintained at an elevated temperature, for example 100° C. to 125° C.

The process of the invention is capable, for example, of producing a polyethylene polymer material having a Young's modulus (as hereinbefore defined) in excess of $3 \times 10^{10}$ N/m$^2$ and in some cases at least $5 \times 10^{10}$ N/m$^2$ together with outstanding creep properties namely a creep strain at room temperature of less than 3% after 15 hours under a stress which produces an initial strain of 1% after 10 seconds. It has been found that in some cases, notably polymer materials of lower molecular weight, creep resistance can be further improved by irradiating the polymer with a suitable source of ionising radiation.

It has also been found that subjecting a polymer material to the process of the invention, its melting point can be elevated, as shown in tabular form below.

| Polymer | Preparation | Melting Point (°C.) |
|---|---|---|
| Rigidex 50 ($M_w$ = 101,450) | Isotropic, quenched | ~131 |
|  | Draw Ratio 25 Draw Temp. 75° C. | 136 |
| H020-54P ($M_w$ = 312,000) | Isotropic, quenched | ~132 |
|  | Draw Ratio 25 Draw Temp. 115° C. | 140 |

Peak melting temperatures as measured in a differential scanning calorimeter using a heating rate of 10° C./min.

The following Examples illustrate the invention:

EXAMPLE 1

This example describes the production of a high density polyethylene polymer material according to the invention, and a comparison of its creep properties with a low molecular weight high density polyethylene polymer.

The materials used (Table 1) were two grades of linear polyethylene homopolymer produced by B.P. Chemicals Int. (Ltd.). For comparative purposes results are also shown for a Rigidex 50 polymer (B.P. Chemicals Int. (Ltd.) with $\overline{M}_w$=101,450, $\overline{M}_n$=6,180, $\overline{M}_w/\overline{M}_n$=16.4 and a melt flow index (BS Method 105 C) of 6.

Dumbbell samples with gauge dimensions 1 cm×0.2 cm were cut from 0.5 mm thick sheets compression moulded at 160° C. between copper plates. The drawing was performed in an Instron Tensile Testing machine at a constant cross-head speed of 10 cm/min for 300 secs, in air and at temperatures ranging from 75° to 125°. The draw ratio was measured from the displacement of ink-marks on the sample surface originally spaced 0.1 cm apart.

The initial moduli were determined using the method of Gupta & Ward, J. Macromol. Sci. Phys. B1 373 (1967). In the long term creep experiment the sample displacement was measured optically (cathetometer) using two reference marks on the sample surface.

The results concerning the effect of draw temperature on the maximum draw ratio obtainable are summarized in Table 2. The influence of molecular weight can be clearly seen by comparing the performance of the samples at the same draw temperature. The mechanical properties of the drawn samples are shown in Table 3; it can be noted how the R190 grade drawn to draw ratio 20 is comparable with the H020-54 samples of much higher draw ratio (34) but lower molecular weight.

TABLE 1

Rheological and molecular weight characteristics of samples used

| Grade | High Load Melt Flow Index (ASTM D 1238 Condition F) | $\overline{M}_w$ | $\overline{M}_n$ | $\overline{M}_w/\overline{M}_n$ |
|---|---|---|---|---|
| H020-54P | 2.0 | 312,000 | 33,000 | 9.5 |
| R 190 | 0.11 | ~800,000 | — | >12 |

TABLE 2

Maximum effective draw ratio as a function of draw temperature

| Draw temperature (°C.) | Maximum draw ratio H020-54P | R 190 |
|---|---|---|
| 75 | 18 | 12 |
| 95 | 24 | — |
| 105 | 30 | — |
| 115 | 34 | 20 |
| 120 | 33 | — |
| 125 | 40 | 20 |

Rigidex 50 fails to draw at the speed used at 115° C.

TABLE 3

| Polymer grade | Draw ratio | Initial modulus (GN/m$^2$) | Stress (GN/m$^2$) | Time | Strain (%) |
|---|---|---|---|---|---|
| RIGIDEX 50 | 34 | 70 | 0.15 | 10 sec | 1 |
|  |  |  |  | 10$^3$ sec | 2.8 |
|  |  |  |  | 2 hrs | 7.5 |
|  |  |  |  | 3 hrs | failure |
| H020-54P | 34 | 63 | 0.15 | 10 sec | 1 |
|  |  |  |  | 10$^3$ sec | <1.5 |
|  |  |  |  | 2 hours | <1.5 |
|  |  |  |  | 15 hrs | 2 |
| R 190 | 20 | 36 | 0.15 | 10 sec | 0.7 |
|  |  |  |  | 10$^3$ sec | 1.6 |
|  |  |  |  | 2 hrs | <2 |
|  |  |  |  | 23 hrs | 2.4 |

EXAMPLE 2

High density polyethylene (H020-45P a product of B.P. Chemicals Int. (U.K.) Ltd. - having $\overline{M}_w$ of 312,000 $\overline{M}_n$ of 33,000 and a melt flow index - ASTM D1238 Condition F- of 2.0) was extruded at 240° C. through a spinneret having a circular orifice of 1 mm diameter to give a filament which was passed through a bath of glycerol maintained at 120° C. before being wound up at a speed of 5 m/min. The bath service was at a distance of approx. 10 cm from the spinneret and the bath dwell time was 12 sec. The spun filament had a diameter of ~0.7 mm.

The isotropic filament was drawn on a conventional two-roller drawing frame through a glycerol bath at 120° C. The ratio of the speeds of the feed roller to the draw ratio was 1:25 with a wind-up speed of approximately 35 m/min.

The actual draw ratio attained was 23:1 as measured from the ratio of initial to final filament cross-section.

The room temperature Young's modulus was measured from the 10 sec response in a dead-loading creep experiment at a strain level of 0.1%.

TABLE 4

| Grade | Draw Ratio | Young's Modulus (GN/m$^2$) |
|---|---|---|
| H020-54P | 23 | 35 |

EXAMPLE 3

The material used was an ethylene-hexene-1 copolymer (002-55 B.P. Chemicals Int. (U.K.) Ltd.,) with the following characteristics:

$\overline{M}_n = 16,900$ $\overline{M}_w = 155,000$

Branches (n-butyl) per $10^3$ C atoms 1-1.5

MFI (BS 2782 Method 105 C) = 0.15

Dumbbell samples with gauge dimensions 2 cm × 0.5 were cut from a 0.5 mm thick sheet compression moulded at 160° C. between copper plates and subsequently quenched in water at room temperature. The drawing was performed in an Instron Tensile Testing machine at a constant cross-head speed of 10 cm/min, in air for ~230 sec. and at a temperature of 95° C. The draw ratio was measured from the displacement of ink marks on the sample surface. In the long term creep experiment the sample displacement was measured using a cathetometer and two reference marks on the sample surface.

The results are summarised in Table 5. It can be seen from the Table that, for the same conditions of preparation and comparable draw ratio, copolymerization produces improvements in the creep behaviour which are substantially identical to those measured for homopolymers of much higher molecular weight (R 190 Grade).

TABLE 5

| Polymer grade | Draw ratio | Stress (GN/m$^2$) | Creep Time | Strain % |
|---|---|---|---|---|
| 002-55 | 20 | 0.15 | $10^3$ sec | 1.2 |
| | | | 3 hrs | 1.5 |
| | | | 15 hrs | 1.5 |
| R 190 | 20 | 0.15 | $10^3$ sec | 1.6 |
| | | | 3 hrs | 1.7 |
| | | | 15 hrs | 1.8 |

We claim:

1. An oriented polymer material selected from the group consisting of ethylene-propylene block copolymers and ethylene-hexene-1 copolymers having a weight average molecular weight from 150,000 to 300,000; a ratio of weight average molecular weight to number average molecular weight greater than 5; and a creep strain at room temperature of less than 3% after 15 hours under a stress which produces an initial strain of 1% after 10 seconds.

2. An oriented polymer material according to claim 1 in the form of a fibre.

3. An oriented polymer material according to claim 1 in the form of a film.

4. An oriented polymer material according to claim 1 in the form of a tape.

5. An oriented polymer material according to claim 2, wherein the diameter of the fibre is less than 1 mm.

6. An oriented polymer material according to claim 3, wherein the thickness of the film is less than 1 mm.

7. An oriented polymer material according to claim 4, wherein the thickness of the tape is less than 1 mm.

8. A cement composition comprising an oriented polymer material according to claim 1.

9. A fibre-reinforced polymer resin containing as a reinforcing material an oriented polymer material according to claim 1.

10. An oriented polymer material having a weight average molecular weight greater than 300,000; a ratio of weight average molecular weight to number average molecular weight greater than 5; and a creep strain at room temperature of less than 3% after 15 hours under a stress which produces an initial strain of 1% after 10 seconds, said polymer material being selected from the group consisting of ethylene/propylene block copolymers, ethylene/hexene-1-copolymers, polypropylene or a substantially linear polymer of ethylene containing at least 95% by weight of ethylene and having a density from 0.91 to 1.0 gm/cm$^3$ as measured by the method of British Standard Specification No. 2782 (1970) method 590B on a sample prepared according to British Standard Specification No. 3412 (1966) Appendix A and annealed according to British Standard Specification No. 3412 (1966) Appendix B(1) wherein said oriented polymer material is in the form of a fibre, film or tape.

11. An oriented polymer material according to claim 10 in the form of a fibre.

12. An oriented polymer material according to claim 10 in the form of a film.

13. An oriented polymer material according to claim 10 in the form of a tape.

14. An oriented polymer material according to claim 11, wherein the diameter of the fibre is less than 1 mm.

15. An oriented polymer material according to claim 12, wherein the thickness of the film is less than 1 mm.

16. An oriented polymer material according to claim 13, wherein the thickness of the tape is less than 1 mm.

17. A cement composition comprising an oriented polymer material according to claim 10.

18. A fibre-reinforced polymer resin containing as a reinforcing material an oriented polymer material according to claim 10.

* * * * *